INVENTORS
MANFRED SCHUTZ
WILHELM SCHAFER
OTTO SANGER
By Toulmin & Toulmin
Attorneys

United States Patent Office 2,994,258
Patented Aug. 1, 1961

2,994,258
FOCUSING MOUNT FOR PHOTOGRAPHIC AND CINEMATOGRAPHIC OBJECTIVES
Wilhelm Schafer and Otto Sanger, Wetzlar, Lahn, Germany, and Manfred Schutz, Balgach, Switzerland, assignors to Ernst Leitz, G.m.b.H., Wetzlar, Germany
Filed Sept. 15, 1958, Ser. No. 761,151
Claims priority, application Germany Sept. 19, 1957
8 Claims. (Cl. 95—45)

The present invention relates to a focusing mount for both still and motion picture camera objectives, more particularly, to a focusing mount having an adjusting handle which is capable of concurrently adjusting both the diaphragm and the range finder of the focusing mount.

It has been previously known to provide a focusing mount for both still and motion picture camera objectives with a movable handle which is connected with both the mechanism for setting the diaphragm and the range finder. Thus it was possible with such a focusing mount to selectively set the diaphragm and to adjust the range of the objective. These structures, however, necessitated an intermediate movement and also the locating of the correct position of the connection between the diaphragm-setting member and the range finder before another adjustment could be made. This procedure was time-consuming and could not be tolerated in those photographic situations wherein still pictures were being made of action or when motion pictures were being made.

The above disadvantage has been eliminated by the present invention. In this invention the focusing mount of the objective is provided with an adjusting member which is in working connection with both the range finder and the diaphragm-setting member and which is movable in different directions, with each of the different directions being for adjusting either the range finder or the diaphragm-setting member.

Since the adjusting member is capable of two distinct directions of movement, the necessity of a coupling or intermediate movement is eliminated. Furthermore, both of the adjustments to the diaphragm and to the range finder may occur concurrently since the adjusting member may be moved in both of the directions at the same time. The present invention is particularly advantageous for the focusing mounts in motion picture cameras because, in the making of motion pictures, particularly when moving objects are concerned, the focusing values have to be constantly changed.

The adjusting member of this invention is mounted for both rotary movement about the optical axis of the focusing mount and for pivoting movement in a direction axially of the focusing mount. In the one direction of movement the diaphragm is set, and in the other direction of movement the movement of the range finder is accomplished so as to focus the objective. In objectives which are already equipped with the conventional axially displaceable adjusting member which is not actuated by screw type displacement to focus the objective, the adjusting member can be so mounted as to be additionally capable of rotative movement, and this rotative movement can be transmitted to the diaphragm-setting mechanism.

It is also possible that the diaphragm can be adjusted by axial displacement of the adjusting member, and focusing of the range finder may be achieved by rotating the adjusting member. The adjusting member may comprise a ring provided with a handle.

The preferred embodiment of the present invention comprises an adjusting member which includes a lever which is pivotally mounted on a ring which is rotatably mounted upon the focusing mount. The ring is coupled with the mechanism for setting the diaphragm. One of the lever arms is provided with a toothed segment on the end thereof, which segment meshes with a system of annular teeth mounted upon an axially displaceable objective tube. The adjusting member in the form of the pivotally mounted lever is accordingly movable both around the optical axis of the focusing mount and also in the direction of the optical axis. Further, in another position of adjustment of the pivotally mounted lever, the lever is operably connected to both the diaphragm-setting mechanism and the mechanism for adjusting the range finder. It is preferred that the pivoting movement of the lever in the axial direction be so connected to the focusing mount as to adjust the range finder mechanism. When the focusing mount constructed in accordance with this invention is used upon a camera which is generally employed in the upright position, it is advantageous to have the adjusting lever where it may be found in a readily accessible position at all times.

A further modification of this invention comprises forming the ring in two equal rings, which rings are rotatable with respect to each other and which can be connected to each other by coupling members. One of said rings is then connected with the diaphragm-setting mechanism and the other ring carries the pivotally mounted lever for adjusting the range finder.

When the present invention is incorporated in a focusing mount having an objective with variable magnification, the pivotally mounted lever may function as the support of a focusting driving mechanism, the actuation of which causes a displacement of the optical member of the objective to modify the magnification factor.

It is the principal object of this invention to provide an improved and novel focusing mount for still and motion picture cameras.

It is another object of this invention to provide an improved focusing mount for both still and motion picture cameras wherein both the range finder mechanism and the diaphragm-setting mechanism may be adjusted simultaneously.

It is still a further object of this invention to provide a focusing mount for both still and motion picture cameras wherein the adjusting member is in operative connection with the mechanism for adjusting the diaphragm setting and the range finder at all times.

Other objects and advantages of this invention will become apparent upon reference to the accompanying description when taken in conjunction with the following drawings, wherein.

Figure 1:
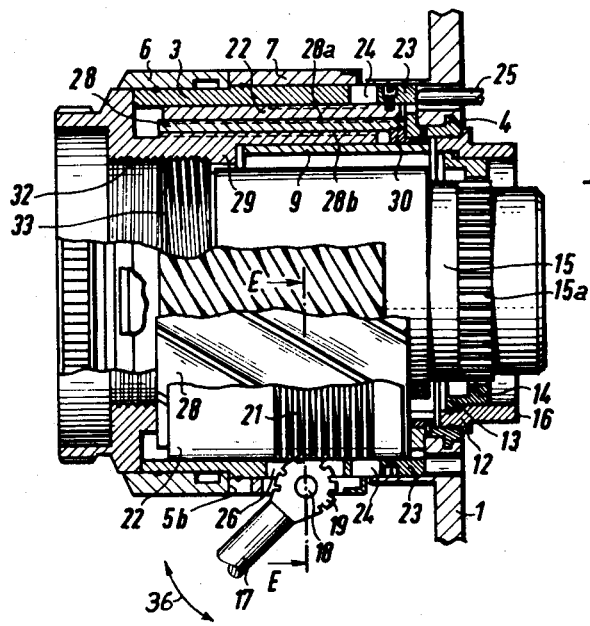
FIGURE 1 is a longitudinal sectional view through a focusing mount constructed in accordance with the teachings of this invention along the lines A—A of FIGURE 3.

Proceeding next to the drawings, wherein like reference symbols indicate the same parts throughout the various views, there is shown in FIGURE 1 a housing wall 1 of a motion picture camera 2 (see FIGURE 4) in which there is attached a mount part 3 by a coupling mechanism comprising bayonet lugs 4. This coupling 4 mounts the objective to the wall of the camera in such a way that the objective is readily removable therefrom.

A bolt 5 is employed to couple a pair of rings 6 and 7 which are rotatably mounted on the outer cylindrical surface of the mount part 3. The rings 6 and 7 are held against axial movement. The bolt 5 is movably mounted in the ring 6 and engageable alternatively in one of two slots 5a and 5b of ring 7.

Figure 2:
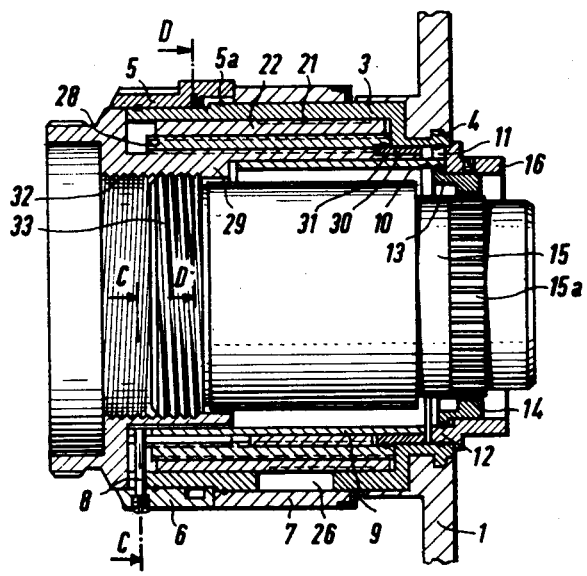
FIGURE 2 is also a longitudinal sectional view taken through the same focusing mount but at an angle of 90° with respect to the sectional view of FIGURE 1 and along the lines B—B of FIGURE 3.
Figure 3:
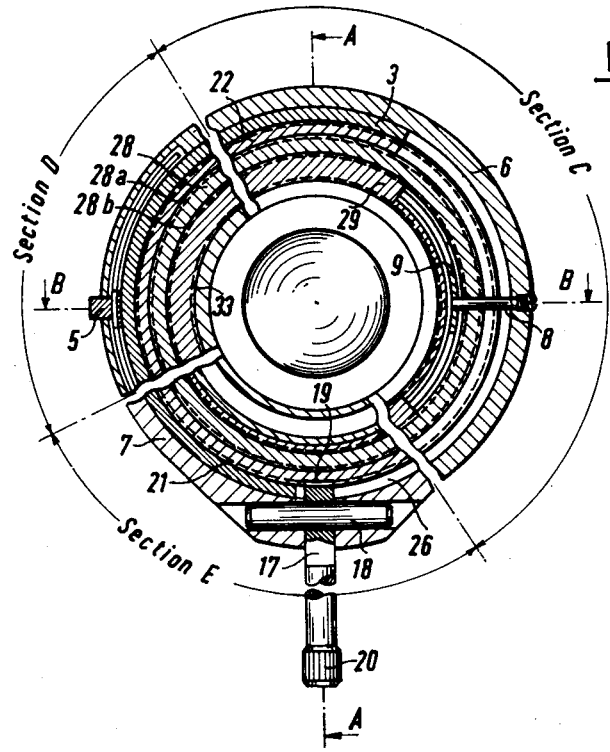
FIGURE 3 is a transverse sectional view of the focusing mount of this invention taken along the section planes C, D and E as indicated on FIGURES 1 and 2.

A pin 8 connects the ring 6 with a cylindrical member 9 which has an axially projecting flange 10 which extends into the slot 11 of a socket member 12. The socket member 12 is mounted upon the mount part 3 and is capable of rotation therein. A ring 13 is rigidly connected with the socket 12 but is adjustable with respect to said socket. The ring 13 is provided with internal gear teeth 14 which mesh with the external gear teeth 15a on the diaphragm-setting member indicated by 15 as seen in FIGURE 2.

The socket member 12 can be provided with a curved annular sector 16 which acts as a cam to adjust a driving mechanism which is not shown but can be in driving connection with a light or exposure meter in order to achieve a coupling between the diaphragm-setting and exposure meter reading.

The second ring 7 is a part of the structure used to adjust the range finder mechanism of the focusing mount and comprises a lever 17 which is pivotally mounted thereon about an axis 18 which is located laterally of and perpendicular to the optical axis of the focusing mount. There is a handle 20 at the extreme end of one arm of the lever 17, and there is a toothed segment 19 on the end of the other arm of the lever. The toothed segment 19 meshes with a plurality of annular teeth 21 located on the tube 22. The tube 22 is axially movable within the mount part 3 and is guided by means of the lugs 23 which are received in the grooves 24. The lugs 23 can also be used as operating members for a range finder which may be coupled with the objective. For this purpose a connecting lug or pin 25 is passed through a bore hole of the camera housing wall 1 so as to transmit the movements of the lugs 23 to the optical measuring member of the range finder.

The mount part 3, which is between the ring 7 and the tube 22, is provided with a slot 26 through which the toothed segment 19 of the lever 17 projects. The slot 26 is of such an extent that the setting of the diaphragm and rotation of the ring 7 together with the adjusting member mounted thereon, can be achieved with the pivoting movement of the lever 17.

A cylindrical member 28 which has a differential helix thereon is rotatably mounted upon the mount part 3 but is fixed against axial movement thereon. The tube 22 is in driving connection with an objective tube 29 by means of an outer external threading 28a which functions as a driving means and an inner feeding threading 28b. The tube 29 is guided axially by a bore 31 which is received in a slot 40 provided on the stationary mount part 3. The mount tube 29 comprises internal threads 32 in which the mounting for the objective lens 33 is threaded.

Figure 4:
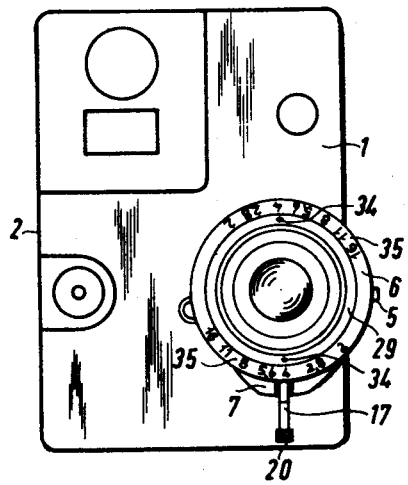
FIGURE 4 is a front elevational view of a motion picture camera fitted with the focusing mount of this invention.

On the front face of the mount tube 29 next to the objective, there are engraved a pair of marks 34. The ring 6 which is coupled with the ring 7 has two identical diaphragm value scales 35 engraved thereon and can be adjusted with respect to the marks 34 by the pivotally mounted lever 17. The above-described marks are illustrated in FIGURE 4.

With the above description of the invention in mind, the operation of the focusing mount of this invention will next be described.

In order to vary the position of the objective so as to compensate for various distances of the object from the camera, the pivotally mounted lever 17 is pivoted in the direction of the arrow 36 shown in FIGURE 1. This will cause the toothed segment 19 to pivot about the axis 18, and this pivoting movement will be transmitted to the annular teeth 21 to axially displace the tube 22 along the optical axis of the focusing mount. The axial movement of the tube 22 is then transmitted to the mount ring 29 through the differential helix 28 in a transmission ratio which is determined by the position of the helical teeth 28a and 28b. The external teeth 28a and 28b of the differential helix are so chosen that the tube 29 is capable of a range of movement dependent upon the focal length of the objective.

In order to change the setting of the diaphragm, the lever 17 is moved so as to rotate about the optical axis of the focusing mount. This rotative movement will be transmitted to the ring 6 which is coupled to the ring 7, to the cylindrical member 9, and through the intermeshing teeth 14 and 15a to the diaphragm-setting member 15.

While it is understood that the adjusting lever 17 may be generally positioned at any position around the perimeter of the focusing mount, it is desirable that when using the camera employing the focusing mount of this invention in the upright position, that the adjusting lever 17 be at all times approximately in the same position, which is below the objective as illustrated in FIGURE 4. To accomplish this, the ring 7 is rotated until the lever 17 reaches a desired position. When the lever 17 is approximately in the position as shown in FIGURE 4, the bar 5 is then permanently secured with one of the slots in the ring 6. With this arrangement, both the rings 6 and 7 can rotate about the mount part 3 and the annular position of the adjusting lever 17 can be maintained.

In setting the diaphragm, the exposure meter can be operatively connected to the diaphragm-setting mechanism by the cam 16 so as to be able to adjust the diaphragm in accordance with the readings on the exposure meter.

Thus it can be seen that the present invention provides an improvement in focusing mounts for both still and motion picture cameras. Several modifications of the invention as described above are possible, but only the preferable structural embodiments have been described. By employing this invention, both the mechanism for adjusting the diaphragm and for adjusting the position of the objective are operatively connected with the adjusting member at all times. The resulting structure is a simple and effective focusing mount which enables the camera operator to rapidly adjust the diaphragm and the distance of his objective in accordance with changing conditions.

It will be understood that this invention is susceptible to modification in order to adapt it to different usages and conditions, and, accordingly, it is desired to comprehend such modifications within this invention as may fall within the scope of the appended claims.

What is claimed is:

1. In a focusing mount for a camera, a mount part, a diaphragm at one end of said mount part, means on said mount part for setting said diaphragm, an objective at the other end of the mount part, a focusing tube on the mount part for positioning said objective, a ring rotatably mounted on said mount part and coaxial with said objective, means connecting said rotatable ring with said diaphragm-setting means so that rotation of said ring adjusts the diaphragm setting, and means on said ring operatively connected to said focusing tube for actuating the same and being movable axially of the mount to axially move said focusing tube so as to adjust the position of said objective.

2. In a focusing mount for a camera, a mount part, a diaphragm at one end of said mount part, means on said mount part for setting said diaphragm, an objective at the other end of the mount part, a focusing tube on said mount part for positioning said objective, a ring rotatably mounted on said mount part and coaxial with said objective and connected to said diaphragm-setting means to adjust said diaphragm by rotation of said ring, and a lever pivotally mounted on said ring and pivotable in the axial direction of said mount part and connected to said focusing tube to axially move said focusing tube so as to adjust the position of said objective.

3. In a focusing mount for a camera, a mount part, a diaphragm at one end of said mount part, means on said mount part for setting said diaphragm, an objective lens at the other end of the mount part, a focusing tube on said mount part for positioning said objective lens, a pair of similar rings rotatably mounted on said mount part and coaxial therewith with one of said rings being connected to said diaphragm-setting means, a lever pivotally mounted on the other of said rings and operatively connected to said focusing tube for actuating the same, and means for coupling said pair of rings together so that said diaphragm-setting means and said focusing tube can be adjusted concurrently but independently of each other.

4. In a focusing mount for a camera as claimed in claim 3 with there being diaphragm settings engraved on the ring connected with said diaphragm-setting means.

5. In a focusing mount for a camera, a tubular mount part being coaxial with the axis of the focusing mount, a diaphragm at one end of said mount part, means on said mount part and coaxial therewith for setting said diaphragm, an objective at the other end of the mount part, a focusing tube on said mount part and coaxial therewith for positioning said objective, a ring rotatably mounted on said mount part, and a lever pivotally mounted on said ring and operatively connected to both said focusing tube and diaphragm-setting means and movable in two different directions to adjust said focusing tube and said diaphragm-setting means concurrently but independently of each other.

6. In a focusing mount for a camera, a mount part, a diaphragm at one end of said mount part, means on said mount part for setting said diaphragm, an object at the other end of the mount part, a focusing tube rotatably and axially movable in said focusing mount and coaxial therewith, there being at least one annular groove in the outer surface of said focusing tube, a ring rotatably mounted on said mount part and connected to said diaphragm-setting means to adjust said diaphragm by rotation of said ring, a lever pivotally mounted on said ring and pivotable in an axial direction with respect to the focusing mount, and at least one tooth on the end of said lever engaging said focusing tube annular groove whereby pivoting movement of said lever will move said focusing tube axially, and means connecting said focusing tube with said objective to adjust the position thereof.

7. In a focusing mount for a camera, a mount part, a diaphragm at one end of said mount part, means on said mount part for setting said diaphragm, an objective at the other end of the mount part, a focusing tube rotatably and axially movable in said focusing mount and coaxial therewith, there being at least one annular groove in the outer surface of said focusing tube, a ring rotatably mounted on said focusing mount part and connected to said diaphragm-setting means to adjust said diaphragm by rotation of said ring, a lever pivotally mounted on said ring and pivotable in an axial direction with respect to the focusing mount, and at least one tooth on the end of said lever engaging said focusing tube annular groove whereby pivoting movement of said lever will move said focusing tube axially, the other end of said lever comprising a handle for actuating said lever, and means connecting said focusing tube with said objective to adjust the position thereof.

8. In a focusing mount for a camera, a tubular mount part coaxial with the axis of the focusing mount, a diaphragm at one end of said mount part, means on said mount part for setting said diaphragm, an objective tube rotatably and axially mounted in said mount part, a focusing tube coaxial with said objective tube and mounted within said mount part for axial movement, there being a plurality of annular grooves in the outer surface of said focusing tube, a ring rotatably mounted on said mount part and connected to said diaphragm-setting means to adjust said diaphragm by rotation of said ring, a lever pivotally mounted on said ring and pivotable in an axial direction with respect to the focusing mount, at least one tooth on the end of said lever engaging said focusing tube annular groove whereby pivoting movement of said lever will move said tube axially, and a differential helix between said objective tube and said focusing tube and drivingly engaged to both of said tubes so that axial movement of said focusing tube will be transmitted to said objective tube to adjust axially the said objective tube.

References Cited in the file of this patent
UNITED STATES PATENTS

| | | |
|---|---|---|
| 830,820 | Bausch | Sept. 11, 1906 |
| 1,879,737 | Del Riccio | Sept. 27, 1932 |
| 2,213,749 | Strauss | Sept. 3, 1940 |
| 2,901,957 | Fahlenberg | Sept. 1, 1959 |